Jan. 10, 1956  A. J. BANNING  2,729,983
DRIVING GEAR FOR AUTOMATIC LATHES
Filed July 18, 1951  2 Sheets-Sheet 1

Inventor
Alfred James Banning

Jan. 10, 1956 A. J. BANNING 2,729,983
DRIVING GEAR FOR AUTOMATIC LATHES
Filed July 18, 1951 2 Sheets-Sheet 2

Inventor
Alfred James Banning

By Hopes Leonard & Glenn
his attorneys

United States Patent Office 2,729,983
Patented Jan. 10, 1956

2,729,983
DRIVING GEAR FOR AUTOMATIC LATHES

Alfred James Banning, Hove, England, assignor to C. V. A. Jigs, Moulds & Tools Limited, Hove, England, a British company Application July 18, 1951, Serial No. 237,464

Claims priority, application Great Britain July 27, 1950

6 Claims. (Cl. 74—472)

This invention relates to driving gear for automatic lathes, and particularly for screw-cutting lathes, in which the direction of rotation of certain shafts require to be changed without changing the direction of rotation of others.

For example, it is important that a shaft, known as a back shaft, which controls the timing of the machine, should always be driven in the same direction at a preselected constant speed (thus providing a uni-directional control shaft), while the main work spindle may not only require to be driven at different speeds but in either direction at each of those speeds. Heretofore, the required results have been obtained by the provision of a reversible electric motor and by driving the back shaft through a belt which is crossed or uncrossed according to which direction the motor is rotating. This adjustment of the belt has been by hand, and if the operator has failed to carry out the necessary adjustment of the belt, serious damage of the machine may ensue.

The object of the present invention is to overcome that risk.

It is undesirable to employ a uni-directional motor with a uni-directional drive between it and the back shaft, and a reversible change speed drive between the motor and the main spindle, since this leads to complicated and bulky gearing, particularly if the back shaft also requires to be driven at different constant speeds for different settings of the machine.

According to this invention, a driving gear for an automatic lathe comprises a reversible electric motor which is arranged to drive a uni-directional control shaft of the lathe through a reversing gear train, a control member of which reversing gear train is inter-connected with a controller for the reversible electric motor so that a change in direction of the motor is accompanied by a change of setting of the reversing gear train whereby the direction of rotation of the control shaft is maintained constant.

Preferably, the uni-directional gear train comprises a change speed gear.

The reversing gear train may comprise a gear wheel fixed to the driven uni-directional control shaft, a carrier mounted to swing about the axis of the latter shaft, and having rotatably mounted thereon at least two intermeshing pinions, one of which meshes with the gear wheel on the uni-directional control shaft, and a constant speed driving pinion so located that by swinging the carrier one or other of the two pinions on the carrier may be brought into mesh with the driving pinion.

Means may be provided for interconnecting the swinging carrier with the controller for the reversible electric motor.

The following is a more detailed description of the invention as applied to an automatic screw cutting lathe, reference being made to the accompanying drawings in which:

Figure 3 shows the connection with the reversing switch of the motor.

Figure 1:
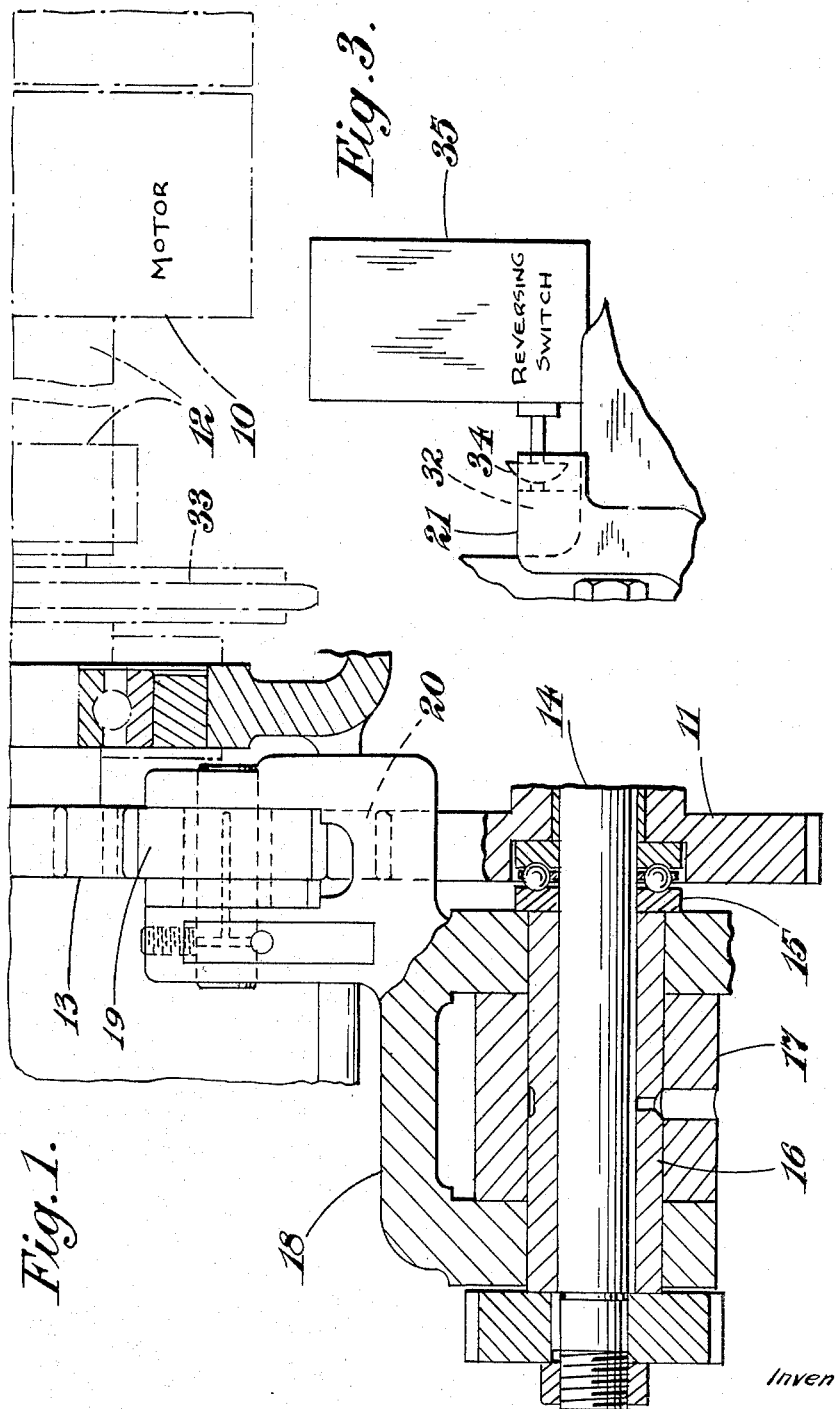
Figure 1 is a plan view, partly in section, of the back shaft and its reversing gear train.
Figure 2:
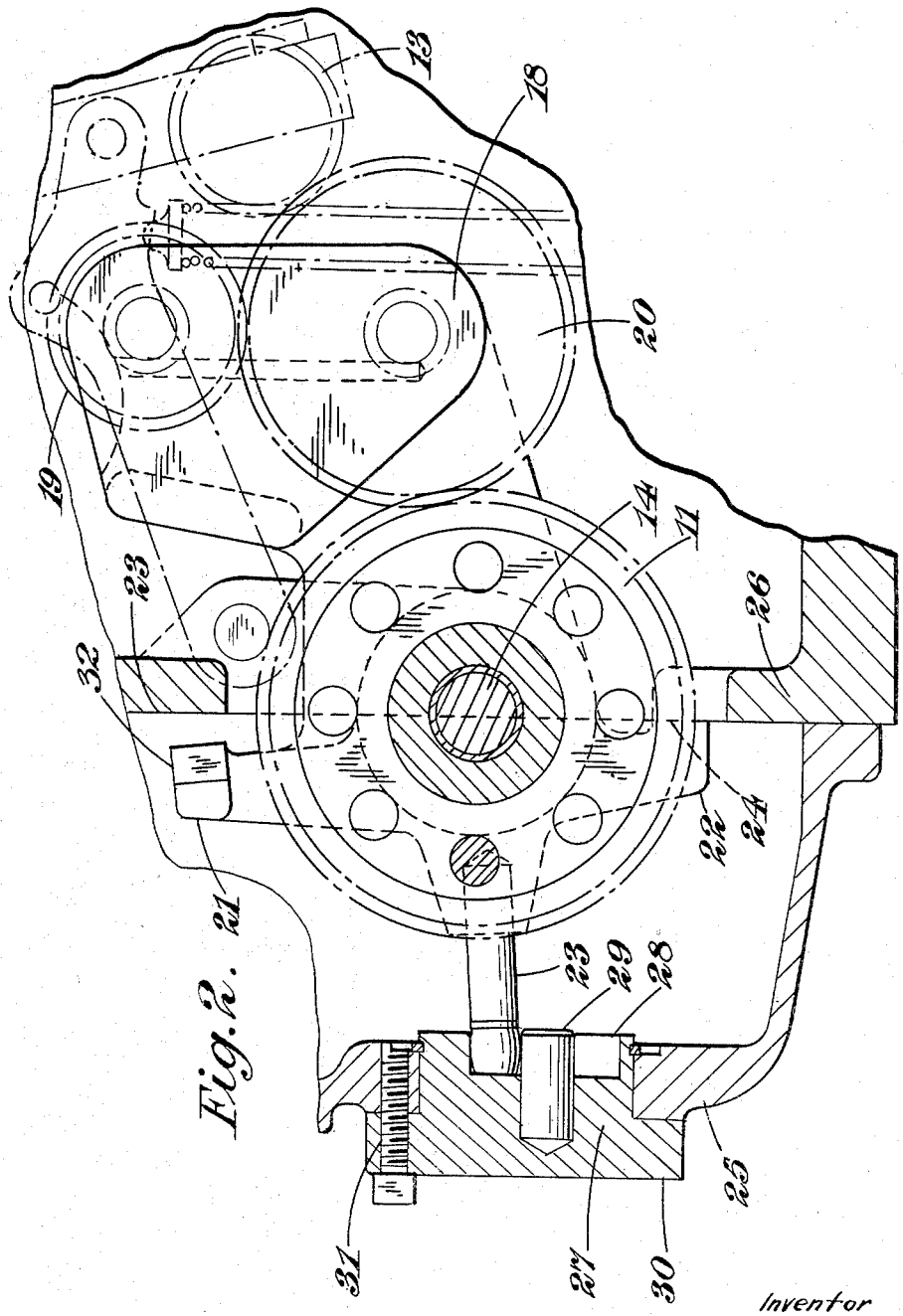
Figure 2 is a vertical section through the back shaft, housing and cover plate, showing a side view of the gear train.

A constant speed shaft 12 is driven by the reversible electric motor (illustrated diagrammatically at 10) and has secured to it a driving pinion 13 by which a drive to the unidirectional control shaft or back shaft 14 may be obtained through a reversing gear about to be described. The back shaft 14 is arranged to extend beyond one of two bearings 15 which carry it and the projecting end extends through a hollow trunnion 16 secured to a bracket 17 mounted on a fixed part of the frame of the apparatus.

Swinging on the projecting ends of the trunnion 16 is a carrier 18 on which are mounted two intermeshing pinions 19 and 20, one of which 20, meshes with a gear wheel 11 clutchable to the back shaft 14. The two pinions 19, 20 on the carrier 18 are so located in relation to the driving pinion 13 on the constant speed shaft 12 that by swinging the carrier 18 about the trunnion 16, one or other of the pinions 19, 20 may be brought into engagement with the driving pinion 13.

The above-mentioned gearing is located in a casing 26 provided with a cover plate 25.

The aforesaid carrier 18 is provided with two lugs, 21, 22 arranged opposite abutment faces 23, 24 on the casing 26 so as to limit the swinging movement, whereby at one limit one of the aforesaid pinions 19, 20 is brought into engagement with the aforesaid driving pinion 13, while at the other limit the other pinion engages with the driving pinion 13. The carrier 18 is also provided with a radially extending pin 23. A plug 27 is rotatably mounted in the cover plate 25 and has on its inner face an eccentrically arranged circular recess 28 having a stud 29 centrally arranged therein, whereby an eccentric circumferential groove is provided. The end of the pin 23 on the carrier 18 is arranged to extend into this groove and the extremity of the pin 23 is so shaped as to permit it to rock in the groove formed between the stud 29 and the cylindrical wall when the plug 27 is rotated to effect the required swinging movement of the carrier 18. The plug 27 is provided with a flange 30 which overlies the outer face of the cover plate 25 and a locking screw 31 is arranged to extend through the flange 30 into one or other of two holes on the cover plate 25 at the limiting movements of the carrier 18.

The lug 21 on the aforesaid carrier is provided with a cam face 32 which at one limit of its movement is arranged to engage a push-button 34 and operates a three-pole electric switch 35 connected with the control circuit of a double contactor which controls the reversible motor, which control switch is returned by a spring when the cam face 32 is moved in the opposite direction. For example, when the switch has been moved by the spring, the control circuit is so connected to the double contactor that it energises the motor and causes it to run in a clockwise direction. When however, the cam face 32 on the lug 21 engages the switch it disconnects one contactor of the control circuit and connects the circuit on the other side of the contactor which causes the motor to be so energised as to run in a reverse direction. This is automatically effected when the plug 27 is moved in a direction to reverse the gear drive to the back shaft 14. The aforesaid constant speed shaft 12 has secured to it a sprocket wheel 33 which drives the work spindle through a change speed gear box.

I claim:

1. A driving gear which is operatively connected to a reversible motor for driving a unidirectional control shaft comprising a transmission between the motor and the unidirectional control shaft, which transmission comprises a driving pinion driven by said electric motor, a driven gear wheel fixed to said control shaft, an oscillatable carrier pivoted about the control shaft and two intermeshing pinions rotatably mounted on said carrier, one of said intermeshing pinions being permanently meshed with the aforesaid driven gear wheel and said intermeshing pinions being meshed one at a time with said driving pinion, a control member for oscillating the oscillatable carrier, thereby changing the intermeshing pinion which is meshed with the driving pinion, a controller for reversing said electric motor, and an operative interconnection between said control member and said controller, whereby oscillation of said oscillatable carrier is accompanied by reversal of the electric motor.

2. A driving gear as claimed in claim 1, in which two abutment members are provided on said oscillatable carrier and two corresponding stops, each engageable by one of said abutment members, are provided on a fixed part of the driving gear, whereby the oscillating movement of the oscillatable carrier in both directions is halted when an intermeshing gear is meshed with the driving pinion.

3. A driving gear as claimed in claim 1, in which said operative interconnection is provided by said oscillatable carrier.

4. A driving gear as claimed in claim 1 in which said control member comprises an arm secured to said oscillatable carrier and a rotatable adjusting member having an eccentric circular groove therein, the free end of said arm lying in said groove whereby rotation of said adjusting member causes oscillation of said arm.

5. A driving gear which is operatively connected to a reversible motor for driving a unidirectional control shaft comprising a transmission between the motor and the unidirectional control shaft, which transmission comprises a driving pinion driven by said electric motor, a driven gear wheel fixed to said control shaft, an oscillatable carrier pivoted about the control shaft and two intermeshing pinions rotatably mounted on said carrier, one of said intermeshing pinions being permanently meshed with the aforesaid driven gear wheel and said intermeshing pinions being meshed one at a time with said driving pinion, a control member for oscillating the oscillatable carrier, thereby changing the intermeshing pinion which is meshed with the driving pinion, a cam member on said oscillatable carrier, and a controller for reversing said electric motor, which controller comprises a reversing switch and a spring-return push-button for operating the reversing switch, said push-button being engageable by said cam member so as to be depressed thereby, whereby oscillation of said oscillatable carrier is accompanied by movement of said push-button and reversal of the electric motor.

6. A driving gear as claimed in claim 5 in which said control member comprises an arm secured at one end to said oscillatable carrier, a rotatable adjusting member having an eccentric circular groove therein, which groove accommodates the end of the arm distant from said carrier, whereby rotation of the adjusting member causes oscillation of the arm, and locking means for securing said adjusting member in position.

References Cited in the file of this patent
UNITED STATES PATENTS

| | | |
|---|---|---|
| 499,929 | Perrigo | June 20, 1893 |
| 2,506,562 | Wait | May 2, 1950 |
| 2,576,570 | Castelli | Nov. 27, 1951 |

FOREIGN PATENTS

| | | |
|---|---|---|
| 229,883 | Switzerland | Feb. 16, 1944 |